United States Patent [19]

Bishop

[11] 3,981,009

[45] Sept. 14, 1976

[54] BERNOULLI-DEMOIVRE SLIDING WINDOW FRIEND-ACCEPT DECIDER

[75] Inventor: Walton B. Bishop, Oxon Hill, Md.

[73] Assignee: The United States of America as represented by the Secretary of the Navy, Washington, D.C.

[22] Filed: Sept. 26, 1975

[21] Appl. No.: 617,227

[52] U.S. Cl. .......................... 343/5 VQ; 343/6.5 LC
[51] Int. Cl.² ........................................... G01S 9/00
[58] Field of Search ......... 343/5 DP, 6.5 R, 6.5 LC, 343/7.3, 5 VQ

[56] References Cited
UNITED STATES PATENTS 3,781,881  12/1973  Hovey ............................... 343/5 DP
3,922,673  11/1975  Bishop ........................... 343/6.5 LC Primary Examiner—Richard A. Farley
Assistant Examiner—T. M. Blum
Attorney, Agent, or Firm—R. S. Sciascia; Philip Schneider; Norman Brown

[57] ABSTRACT

A technique for making IFF Friend-Accept decisions based upon either receiving $T_a$ correct replies in any consecutive sequence of W responses in a larger, predetermined number N of responses, or receiving a consecutive series of a predetermined number $R_a$ of correct replies. A Non-Accept indication is provided upon the occurrence of N interrogations before either $T_a$ correct replies are received in the group of W responses, or a consecutive series of $R_a$ correct replies are received. Target leading edge information is also derived from these determinations.

6 Claims, 2 Drawing Figures

BERNOULLI-DEMOIVRE SLIDING WINDOW FRIEND-ACCEPT DECIDER

BACKGROUND OF THE INVENTION

The present invention relates to IFF systems, and more particularly to techniques for deciding whether replies are from a friendly source or not.

In a military environment, it is essential to determine whether an approaching aircraft or other vehicle is a friend or an enemy. This determination is generally accomplished by decision making apparatus called Identification-Friend-or-Foe (IFF) systems. In a typical IFF system, an interrogating station transmits an interrogation signal to which a transponder in an approaching vehicle automatically replies with an answer, or reply signal. The interrogation and reply signals are sometimes coded in a cryptographic fashion according to needs of the situation.

Virtually every IFF system has as its fundamental element a Friend-Accept decider, also commonly known as a "Reply Evaluator". It is this Friend-Accept decider which determines whether received reply-signals appear to come from a friend or an enemy. An enemy may be attempting to guess the code, or repeat previously intercepted "friend" replies, or attempt to interfere with reception of replies transmitted by friends. Hopefully, a Friend-Accept decider will be able to detect these attempts and initiate appropriate action.

Many varieties of IFF systems are currently in use. Present day systems generally allow the enemy too much of a chance to be accepted as a friend, or are too vulnerable to disruptive interference or jamming (which can effectively deny acceptance by an IFF system of a true friend as a friend). For example, an IFF system is described in patent application Ser. No. 78,317, entitled SEMIAUTOMATIC JAM-ACCEPT DECIDER FOR MODE-IV OF THE IFF MARK III by Walton B. Bishop filed in the United States on Sept. 3, 1970. The Friend-Accept decider disclosed in this co-pending application utilizes a Friend-Accept decision criteria that accepts an approaching vehicle as a friend only when it responds with a series of correct replies to a predetermined number of interrogations. In other words, it examines a received set of responses for a "run" of a predetermined number of correct replies in succession.

One of the significant disadvantages of many previous systems is that an enemy, by simply increasing the reply signal power with respect to a "friend" (located the same distance from the IFF antenna) could increase the number of chances to transmit a proper reply signal (because the greater signal energy will then be received over a larger angular antenna scanning space as the antenna sweeps by the target vehicle). Also, in many previous systems, the enemy can deny a friendly vehicle acceptance as a friend by simply transmitting periodic jamming signals which interfere with reception of correct reply signals. This is because a run of correct replies could be interrupted by a jamming signal, and the system would then begin to look for a new set of correct replies.

Some other types of IFF systems utilize a sliding window technique in which an essentially unlimited number of samples are used in carrying out a continuous evaluation process to determine whether an unknown transponder is a friend or foe. The continuous sliding window evaluation process examines a predetermined number of the most recently received reply signals and determines the ratio of correct to incorrect replies. This process, too, is undesirable because it allows the enemy far too many chances to come up with a proper set of reply responses. Sliding window techniques generally require a higher threshold of acceptance for a given level of decision confidence than does a sliding window technique in which the total decision sample is bounded.

Existing Bernoulli-type friend-accept deciders make a friend-accept decision whenever $T_a$ or more replies out of a particular sample of W replies are found to be correct. In general no satisfactory way of selecting the particular sample of W replies to be evaluated has been found.

SUMMARY OF THE INVENTION

The present invention utilizes a two pronged decision procedure to make a Friend-Accept determination in an IFF system. In both procedures, a series of a predetermined number N of interrogation responses are examined. In the first, a target is declared a friend if at least a predetermined number $T_a$ of these responses are correct replies found in a group of a predetermined number W of responses. In the second procedure, a target is declared a friend whenever a predetermined number $R_a$ of consecutive replies in the group of N responses are all correct replies.

A target non-accept determination is made when N interrogations occur before either $T_a$ correct replies are received in a group of W responses or a consecutive series of a $R_a$ correct replies are received.

A trailing edge alerting determination is made when any of the following three conditions occur in response to interrogations; first receiving a number $T_t$ of correct replies in a group of W responses to the N interrogations; second, the reception, before N interrogations are made, of $T_a$ correct replies in a group of W responses followed by receiving a lesser number $T_t$ of correct replies in a subsequent group of W replies (which may partially overlay the prior group); third, before N interrogations are made, both occurrence of a run of $R_a$ consecutive valid replies and having no more than $T_t$ correct replies received in the last group of W responses.

It is therefore an object of the present invention to determine whether the response to IFF interrogations appear to come from a friendly target or not;

It is another object of the present invention to make a friend-accept decision whenever $T_a$ correct replies are found in any consecutive sequence of W replies found in a larger sample of N replies, or whenever $R_a$ consecutive correct replies are found in a larger sample of N replies;

It is a further object of the present invention to minimize the opportunity of an enemy target becoming accepted as a friend by guessing replies, through resort to determining whenever $T_a$ correct replies are found in any consecutive sequence of W replies found in a larger sample of N replies, or whenever $R_a$ consecutive valid replies are found in a larger sample of N replies;

It is yet another object of the present invention to make a target non-accept decision when N interrogations have been made before either receiving $T_a$ correct replies in any group of W replies, or receiving a run of $R_a$ correct replies;

It is a still further object of the present invention to determine a target's trailing edge occurrence based on the number of incorrect replies in a group of W replies, or upon a run of consecutive incorrect replies, or both.

Other objects, advantages and novel features of the invention will become apparent from the following detailed description of the invention when considered in conjunction with the accompanying drawings wherein:

DETAILED DESCRIPTION

Figure 1:
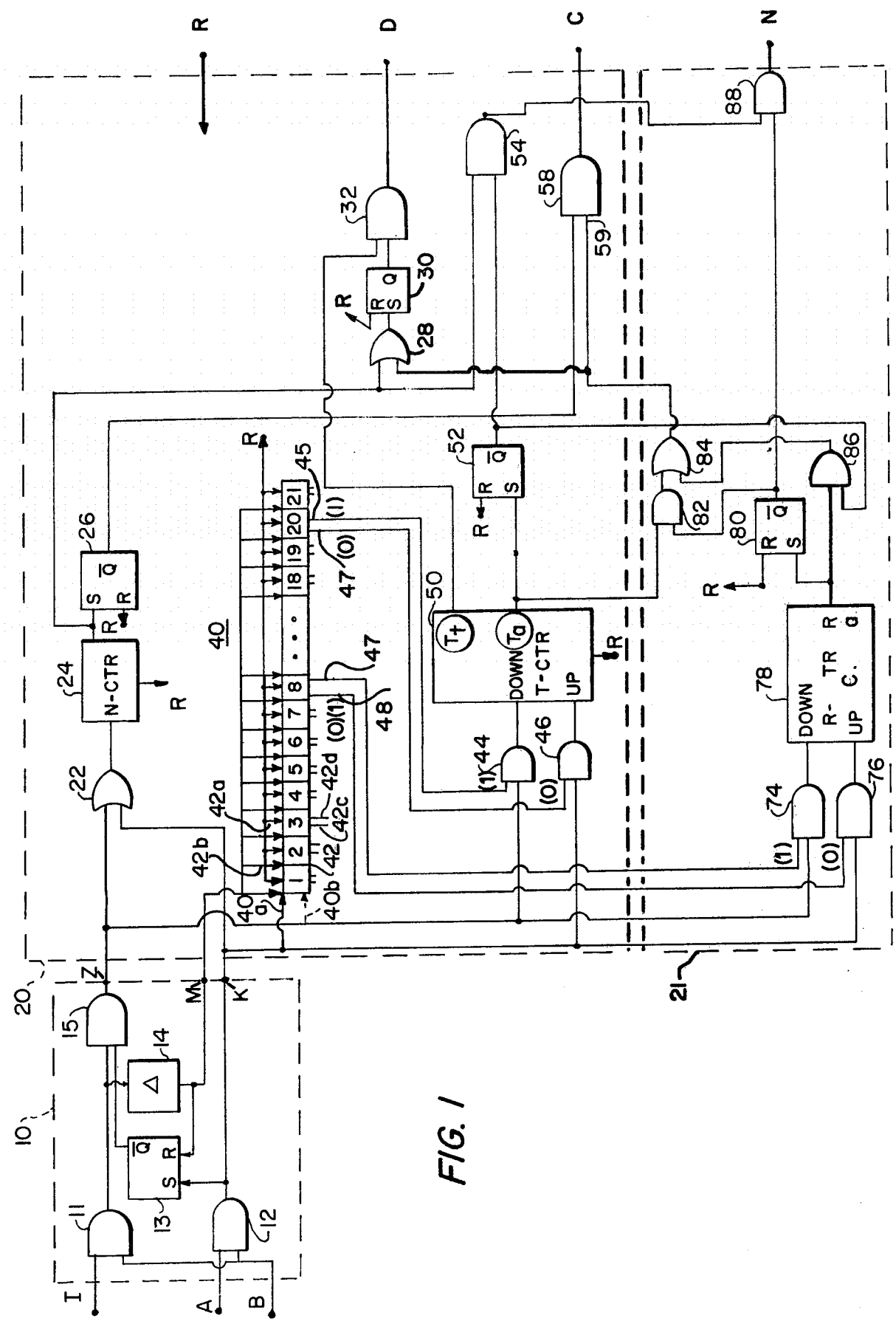
FIG. 1 depicts, in schematic block diagram, a preferred embodiment of the present invention.

Turning now to FIG. 1, an IFF Friend-Accept (F/A) interface device 10 has a first digital output terminal K, a second digital output terminal Z, and a delayed signal digital output terminal M. Interface device 10 has three input terminals denoted as I, A, and B. Interface device 10 has an AND device 11 whose two input terminals are coupled to input terminals I and B. A second AND device 12 has its two input terminals connected to input terminals A and B. The output of AND 12 is connected to the set terminal "S" of flip-flop device 13. The output of AND device 11 is coupled to the input of a delay device 14 and to one of two inputs of an AND device 15. The other input of AND device 15 is coupled to the complementary output terminal $\bar{Q}$ of flip-flop 13. Flip-flop 13 has a reset terminal R coupled to the output of delay device 14. The output of delay device 14 is coupled to output terminal M, the output of AND device 15 is connected to interface output terminal Z and the output of AND device 12 is coupled to output terminal K.

A first decision implementing portion of the embodiment of the present invention is shown in phantom at 20. This portion implements the decision procedure which is based on the existence of T correct replies in any consecutive sequence of W replies in a larger, limited and predetermined number of N replies. A second decision implementing portion, shown in phantom at 21, implements the decision procedure searching for the "run" of consecutive replies.

Connected to interface device 10 is the first portion 20 of the Friend-Accept decider (FAD). Decider network 20 has an OR device 22 whose two input terminals are coupled to interface device output terminals Z and K. The output of OR device 22 is coupled to an N-counter 24 which in turn has its output coupled to the set terminal S of a flip-flop device 26. Both counter 24 and flip-flop 26 have a reset terminal R coupled to a decider reset terminal R. Various other reset terminals R are described as being connected to the FAD network 20 reset terminal R although in the interest of clarity this connection is not shown directly in FIG. 1 but is shown symbolically by an arrowhead labeled R. The output of counter 24 is also connected to an input terminal of an OR device 28. OR device 28 has its output terminal connected to the set terminal S of a flip-flop device 30, whose noncomplementary output terminal Q is connected to an input terminal of an AND device 32. The output of AND device 32 is connected to a FAD-20 output terminal D.

A digital storage device such as a shift register 40 is comprised of a number of individual register stages 42. Each of these stages has a reset terminal 42a connected to FAD-20 reset terminal R, and a shift terminal 42b coupled to F/A interface device output terminal M.

An AND device 44 has a first input terminal coupled to F/A interface device output terminal Z, and a second input terminal connected to a digital "one" tap 45 of the twentieth stage of shift register 40. A second AND device 46 has a first input terminal coupled to F/A interface output terminal K, and a second input terminal coupled to a digital "zero" tap 47 of the twentieth stage of shift register 40. The output terminal of AND device 44 is coupled to the "down" input terminal of a T-counter 50, while the output terminal of AND device 46 is coupled to an "up" input terminal of counter 50. Counter 50 has an output terminal $T_t$ which is coupled to the second input terminal of AND device 32. Counter 50 also has an output terminal $T_a$ coupled to a set terminal S of a flip-flop 52. The complementary output terminal $\bar{Q}$ of flip-flop 52 is coupled to an input terminal of an AND device 54. The second input terminal of AND device 54 is coupled to the output of N-counter 24.

An AND device 58 has a first input terminal coupled to the $\bar{Q}$ output of flip-flop device 26. The output of AND device 58 is connected to a FAD-20 output terminal C.

The second decision implementing portion 21 of the embodiment of the present invention will now be described. Within this portion, or network, and AND device 74 has a first input terminal coupled to F/A interface output terminal Z. A second AND device 76 has its first input terminal coupled to F/A interface output terminal K. AND device 74 has its second input terminal coupled to a digital "one" tap 47' the eighth stage of shift register 40, while AND device 76 has an input terminal coupled to a digital "zero" tap 48' of the eighth stage of shift register 40. The output of AND device 74 is coupled to a "down" input terminal of an R-counter 78, while the output of AND device 76 is coupled to an "up" input terminal of counter 78. The output terminal $R_a$ of counter 78 is coupled to a set terminal S of a flip-flop device 80. Flip-flop 80 has a complementary output terminal $\bar{Q}$ connected to an input of an AND device 82. The other input of AND device 82 is coupled to the output terminal $T_a$ of T-counter 50. The output of AND device 82 is coupled to a first input of an OR device 84, whose output is coupled to the other input terminals of AND devices 58 and 28. An AND device 86 has its first input terminal connected to R-counter output terminal $R_a$, and its second input terminal coupled to the complementary output terminal $\bar{Q}$ of flip-flop 52, and its output terminal coupled to the first input terminal of an AND device 88. The other input terminal of AND 88 is coupled to the output of AND 54.

In operation an associated IFF subsystem generates a leading edge signal when it determines that reply signals being received are sufficiently adequate and reliable enough for further processing. The present invention is adapted to receive a signal of this nature which is applied to input terminal B of Friend/Accept Interface (FAI) device 10. This leading edge signal enables AND gates 11 and 12 until either a friend-accept decision is made, or until a maximum allowable number N of interrogations has been transmitted to an unknown target. Input terminal A is adapted to receive a pulse from the associated IFF subsystem each time a correct reply is decoded from a particular range of interest.

After enough time has elapsed after each interrogation to allow all replies of interest to be decoded, input terminal I will receive a pulse from associated IFF subsystem.

A pulse applied at input terminal A will pass through AND 12 and be inserted as a "one" into the first stage of shift register 40 via its input terminal 40a. This pulse will also set flip-flop 13, thus preventing a subsequent pulse leaving AND 11 from passing through AND 15. The pulse from AND 12 passes through AND 46 and causes T-threshold counter 50 to count up one unit—provided there is a "zero" in stage 20 of shift register 40. The pulse from AND 12 will also pass through OR 22 and cause sample size N-counter 24 to count up one unit.

If at FAI input terminal A no pulse is received preceding a pulse that enters on input terminal I, then the I-terminal pulse will pass through both AND gates 11 and 15 to be applied to both OR 22 and AND 44. Each of such pulses will cause N-counter 24 to count up one "trial", and will pass through AND 44 to cause T-counter 50 to come down one unit—provided there is a "one" in stage 20 of shift register 40. The I-terminal pulse will, after a slight delay (in delay-device 14), reset flip-flop 14 and cause the content of each stage of shift register 40 to be shifted one stage to the right. On the other hand, if the I-terminal pulse is preceded by a pulse on input terminal A, then the I-terminal pulse coming from AND 11 will not be able to pass AND 15, but will reset flip-flop 13 and also cause the content of each stage of shift register 40 to be shifted one stage to the right. If a "zero" (resulting from not receiving a correct reply) is entered into the first stage of register 40, and a "zero" is present in stage 20, then AND 44 will produce no output. If a "one" (resulting from receiving a correct reply) is entered into the first stage of register 40, and a "one" is present in stage 20, then AND 46 will produce no output.

Pulses received on the I or A input terminals will continue to be counted in the just described manner until either a threshold count of $T_t$ is reached by T-counter 50, or N-trial counter 24 reaches a count of N. When T-counter 50 reaches a count of $T_t$, a pulse will be generated (appearing on output terminal $T_a$) by T-counter 50, indicating that an accept-threshold has been reached. This pulse will pass through the normally enabled AND 82, or 84, and AND 58 to provide an output signal at FAD output terminal C—provided that N-counter 24 has not reached a count of N. Accept threshold indicating pulse on terminal $T_a$ will also set flip-flop 52.

Setting of flip-flop 52 will result in terminating the complementary output signal normally provided to enable AND 54 and AND 86. When AND 86 is closed (not enabled), a pulse from R-counter 72 will not be able to pass to produce an output signal on output terminal C.

If no $T_a$ output pulse occurs before N-counter 24 reaches a count of N (this means that the responding target has failed to satisfy the friend-accept criterion), the N-counter pulse (which occurs at the count of N) will pass through AND 54 (providing an input signal to AND 88), will set flip-flop 26, and will also pass through OR 28 to set flip-flop 30. Setting flip-flop 30 will also open AND 32. Setting of flip-flop 26 will prevent any subsequent $T_a$ or $R_a$ output terminal signal from passing through AND 58 by terminating its AND 58 enable voltage. There can then be no output signal on output terminal C.

A pulse from R-counter 78 (on output $R_a$) occurring after one occurs on output $T_a$ (of T-counter 50) will not be able to pass through AND 86. (Note that, as described in more detail later, a setting of flip-flop 80 by this R-counter pulse will then have no effect.) The pulse on lead $T_a$ of T-counter 50 that passes through AND 82 and OR 84 will also pass through OR 28 to set flip-flop 30, and will thus produce a noncomplementary output signal that will enable AND 32 for passing pulses from terminal $T_t$ of T-counter 50.

When R-counter 78 reaches a count of $R_a$, indicating that a run of $R_a$ successive replies are correct, it will produce an output signal at its output terminal $R_a$ indicating that an acceptable run of correct replies has been received. If the $R_a$ signal pulse occurs before either a $T_a$ signal pulse occurs or before N-counter 24 produces its output pulse, then the $R_a$ signal pulse will go through AND 86, OR 84 and AND 58 to produce a signal at FAD output terminal C (indicating that a friend-accept decision has been reached). This $R_a$ pulse will also set flip-flop 80 and thus remove the complementary output signal that normally keeps AND 88 and AND 82 enabled. Again, the pulse that goes through AND 86 also goes through OR 84 and OR 28 to set flip-flop 30, thus opening AND 32 for a pulse from the $T_t$ output of T-counter 50.

If both T-counter 50 and R-counter 78 fail to make a friend-accept decision (and thus there is no output on either leads $T_a$ or $R_a$) before N-counter 24 reaches a count of N, then the output pulse from N-counter 24 (which occurs at the count of N) sets flip-flop 26 and passes through 28 to set flip-flop 30. The setting of flip-flop 26 removes its complementary output voltage signal from AND 58, thus preventing any later friend-accept decision indication signal $T_a$ or $R_a$ from passing to output terminal C. The setting of flip-flop 30 produces a noncomplementary output signal that opens AND 32 for output signals $T_t$. The output pulse from N-counter 24 will also pass through AND 54 and AND 88 to provide a pulse on output lead N, since neither flip-flop 52 nor flip-flop 80 will have been set.

If either a $T_a$ or $R_a$ output pulse is produced before N-counter 24 produces an output pulse, then the pulse from N-counter 24 will have no effect since either AND 54 or AND 88 will be closed to it, and flip-flop 30 will already be set. Output signal pulses $T_t$ occur each time the count of T-counter 50 becomes equal to or less than the trailing edge threshold $T_t$. These $T_t$ pulses will be able to pass AND 32 however, only after occurrence of a $T_a$ pulse, an $R_a$ pulse, or a N-counter 24 output pulse.

The reset terminal R is adapted to receive a reset signal from an associated IFF subsystem after a final Trailing Edge Decision and Azimuth Center Estimation have been made. This input pulse will reset N-counter 24, T-counter 50, and R-counter 78 to zero, will clear shift register 42, and will reset flip-flop 26, 52, 80, and 30, thus making the decider of the present invention ready to evaluate replies from another target.

The described embodiment provides a responding target with N chances to satisfy the Friend-Accept criterion. Whether this criterion is satisfied is determined by the following: the length of the "run" to which run counter 78 counts (or to what stages of shift register 40 AND's 74 and 76 are connected), the threshold $T_a$ to which T-counter 50 must count before producing a $T_a$ output signal; the stage of shift register 40 to which leads of AND's 44, 46 are connected; and the choice of N. If N is set equal to 20, leads of AND's 44, 46 are connected to stage number 21; and T set equal to 12, then the described embodiment of the present invention functions as a fixed sample size Bernoulli decider in which Friend-Accept decisions are made when M out of N replies are correct. (in this case M = 12, N = 20).

It should be noted that shift register 40 operates so that a "zero" is clocked into the first stage on every shift command (pulse from delay device 14). Pulses on terminal H will, if present, be received between shift commands. These H pulses "set" the first stage of the register to a digital (logic) "1" level. The next shift command will transfer to the second stage either the zero or one "set" in the first stage during the previous interval. The Q, $\bar{Q}$ taps of each stage provide "1" and "0" storage information. These stages typically could be implemented by a series of J-K, D-type, or clocked R-S flip-flop devices.

A $T_t$ output terminal pulse is generated for each count of T-counter 50 equal to, or lower than, a preselected value $T_t$. This $T_t$ output signal functions as the FAD trailing edge alerting signal. If T-counter 50 reaches a count of $T_a$ and then counts down to $T_t$ before N replies have been evaluated, (i.e., before N-counter 24 reaches a count of N then the $T_t$ alerting pulse will go immediately through AND 32 to output D and thus may be used to signal other associated IFF subsystems such as trailing edge detector circuits. If T-counter 50 does not reach a count of $T_a$ before N replies have been evaluated, then the first output signal pulse on $T_t$ following the output from N-counter 24 will go through AND 32 (opened by the pulse from N-counter 24) to output T. (Note that T-counter 50 will produce an output on $T_t$ any time its count is equal to or less than $T_t$.)

In summary, a first accept signal will be produced at output terminal C when either of the following two conditions exist: first, the T-counter 50 counts to a predetermined threshold $T_a$ before N-counter 24 reaches a count N. Secondly, when R-counter 78 reaches a predetermined threshold $R_a$ before N-counter 24 reaches a count of N. A non-accept signal will be produced at output terminal N when either N-counter 24 reaches a count of N before either T-counter 50 reaches a count of $T_a$ or R-counter 78 reaches a count of $R_a$. An alerting signal will be produced in either of the three following situations; first, if, before N-counter 24 reaches a count of N, T-counter 50 reaches a count of $T_a$ and counts back down to a count of $T_t$. Secondly, if T-counter 50 reaches a count of $T_t$ or less after N-counter 24 reaches a count of N. Thirdly, if R counter 78 reaches a count of $R_a$ and T-counter 50 is at a count of $T_t$ or less before N-counter 24 reaches a count of N.

Figure 2:
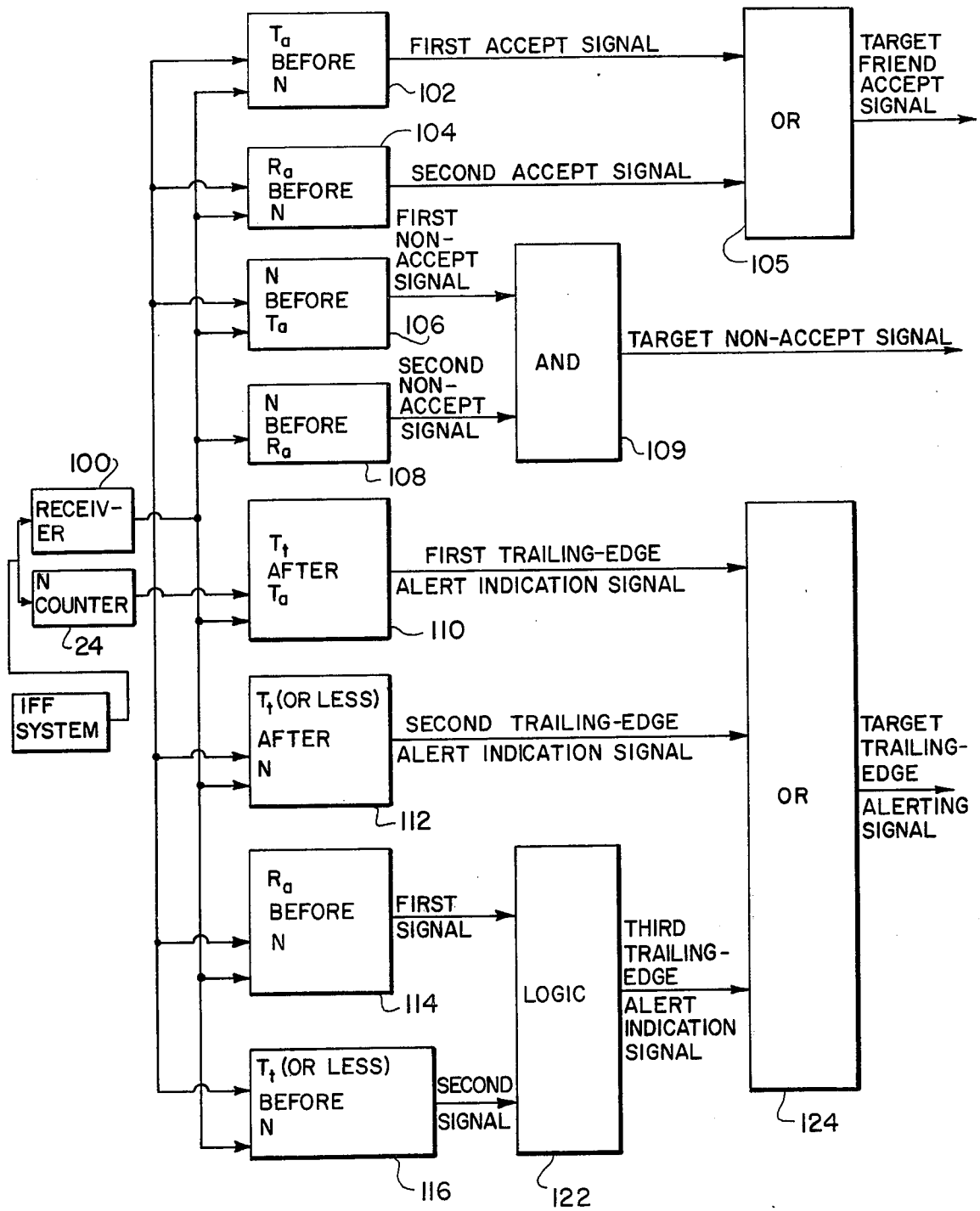
FIG. 2 depicts in functional block diagram fashion the preferred embodiment of the present invention.

FIG. 2 summarizes the functional operation of the described embodiment of the present invention. A receiving-interface portion 100 and an interrogation counter 24 are both adapted to receive information from the associated IFF system. A group of eight decision making portions 102–116 each receive information from both the receive-interface 100 and counter 24, and indicate occurrence of various statistical decisions with respect to the occurrence of N interrogations.

First decision making portion 102 produces a first accept signal when count $T_a$ occurs before N. The second decision making portion 104 produces a second accept signal when run count $R_a$ occurs before N. A logic device 105 produces a Target Friend-Accept signal upon the occurrence of either the first or second accept signal.

The third decision making portion 106 produces a first non-accept signal upon occurrence of N-before-$T_a$, while Fourth decision making portion 108 produces a second non-accept signal upon occurrence of N-before-$R_a$. A logic device 109 produces a Target non-accept signal after receiving both first and second non-accept signals.

The fifth decision making portion 110 produces a first trailing edge alert indication signal upon occurrence of $T_t$-after-$T_t$. A second trailing edge alert indication signal is produced by the sixth decision making portion 112 when $T_t$-occurs-before-N.

A first signal is produced by seventh decision making portion 114 when $R_a$-occurs-before-N, while a second signal is produced by the eighth decision making portion 116 when a count of $T_t$-occurs-before-N. A logic device 122 produces a third trailing edge alert indication signal only after having received the second signal after having received the first signal.

A logic device 124 produces a target trailing edge alert signal upon receiving any of the first, second, or third trailing edge alert indication signal.

Thus, it is clear that the present invention, in addition to other decisions, makes a Friend-Accept decision whenever $T_a$ correct replies are found in any consecutive sequence of W replies found in a larger sample of N replies. It thus makes decisions equivalent to the existing "T out of W" devices when W of fewer replies are collected during a scan. In this manner, the present invention makes decisions having the higher reliability offered by a sliding-window device when more than W but fewer than N replies are received. The present invention does not accept more than N replies during a scan, so that an enemy cannot gain unduly by trying to guess correct replies. The display of two targets where only one exists is prevented by the present invention, by providing a special pulse to a trailing edge detector to indicate when a trailing edge declaration would be expected.

The flexibility provided by the present invention is well suited for use by IFF interrogation systems that have antennas of various sizes (and hence various beamwidths), and also by interrogation systems operating at widely varying interrogation repetition frequencies.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A Friend-Accept decision device for use in an IFF system which, on the basis of replies to interrogations, determines whether the replies appear to come from a friend or not, comprising:

means for receiving replies to interrogations and for indicating when a reply is correct;

means connected to said IFF system for counting the number of interrogations made by the IFF system;

first means connected to said receiving means and to said counting means for producing a first accept signal when a predetermined number $T_a$ of correct replies are received in any consecutive sequence of W responses before no more than N interrogations have been sent;

second means connected to said receiving means and to said counting means for producing a second accept signal when a predetermined run $R_a$ of consecutive correct replies are received before no more than N interrogations have been sent;

logic means coupled to said first and second means for producing a Target Friend-Accept signal upon the occurrence of either said first accept signal or said second accept signal;

third means connected to said receiving means and to said counting means for producing a first non-accept signal when N interrogations have been sent before a predetermined number $T_a$ of correct replies are received in a consecutive sequence of W responses;

fourth means connected to said receiving means and to said counting means for producing a second non-accept signal when N interrogations have been sent before a run $R_a$ of consecutive correct replies are received;

second logic means coupled to said third and fourth means for producing a target non-accept signal upon the joint occurrence of said first and second non-accept signals;

fifth means connected to said receiving means and to said counting means for producing a first trailing edge alert-indication signal when a predetermined number $T_t$ of correct replies in a consecutive sequence of W responses are received after receiving a predetermined number $T_a$ of correct replies in a previous consecutive sequence of W responses;

sixth means connected to said receiving means and to said counting means for producing a second trailing edge alert indication-signal when a predetermined number $T_t$ or less correct replies in a consecutive sequence of W responses are received after N interrogations have been sent;

seventh means connected to said receiving means and to said counting means for producing a first signal when, before N interrogations have been sent a predetermined run of $R_a$ consecutive correct replies are received;

eighth means connected to said receiving means and to said counting means for producing a second signal when, before N interrogations have been sent, a predetermined number $T_t$ of correct replies in a consecutive sequence of W responses are received;

third logic means connected to said seventh and eighth means for producing a third alert-indication signal upon the occurrence of said second signal after occurrence of said first signal; and fourth logic means coupled to said fifth and sixth means and to said third logic means for producing a target trailing edge alert signal upon the occurrence of either of said first, second, or third trailing edge alert indication signal.

2. The Friend-Accept decider of claim 1 wherein said first, third, fifth, sixth, and eighth means further include:

means connected to said receiving means for producing a sequence of information elements, each element corresponding to an interrogation and indicating whether the corresponding response was a correct reply or not;

first means connected to said element producing means for storing a sequence of W of said elements;

means connected to said storage means and to said element producing means for generating a first signal each time that the last produced element corresponds to a correct reply and the element produced W elements before corresponds to other than a correct reply;

means connected to said storage means and to said element producing means for generating a second signal each time that the last produced element corresponds to other than a correct reply and the information element produced W elements before corresponds to a correct reply; and difference count means connected to said first and second signal generating means for accumulating a difference count of the number of said first signals minus the number of said second signals and for producing a signal indicative of the difference count.

3. The Friend-Accept decider of claim 2 wherein:

said first means further includes means connected to said difference counting means and to said interrogation counting means for producing said first accept signal when said difference counting means indicates a predetermined count of $T_a$ before said interrogation counting means indicates a predetermined count of N;

said third means further includes means connected to said difference counting means and to said interrogation counting means for producing said first non-accept signal when said interrogation counting means indicates a predetermined count of at least N before said difference counting means indicates a predetermined count of $T_a$;

said fifth means further includes means connected to said difference counting means and to said interrogation counting means for producing said first trailing edge alert indication signal when said difference indicates a predetermined number $T_t$ after counting to an equal or larger predetermined number $T_a$; and said sixth means further includes means connected to said difference counting means and to said interrogation counting means for producing said second trailing edge alert indication signal when said difference counting means indicates a predetermined count of $T_t$ after said interrogation counting means indicates a predetermined count of at least N;

said eighth means further includes means connected to said difference counting means and to said interrogation counting means for producing said second intermediate indication signal when said difference counting means indicates a predetermined count of $T_t$ or less before said interrogation counting means indicates a predetermined count of N or more.

4. The Friend-Accept decider of claim 1 wherein said second, fourth, and seventh means further include:

means connected to said receiving means for producing a sequence of information elements, each element corresponding to an interrogation and indicating whether the corresponding response was a correct reply or not;

second means connected to said element producing means for storing a sequence of a predetermined number $R_a$ of said elements;

means connected to said storage means and to said element producing means for generating a first signal each time that the last produced element corresponds to a correct reply and the element produced $R_a$ elements before corresponds to other than a correct reply;

means connected to said storage means and to said element producing means for generating a second signal each time that the last produced element corresponds to other than a correct reply element produced $R_a$ elements before corresponds to a correct reply; and second difference counting means connected to said first and second signal generating means for accumulating a difference count of the number of said first signals minus the number of said second signals, and for producing a signal indicative of said second difference count.

5. The Friend-Accept decider of claim 4 wherein:

said second means further includes means connected to said second difference counting means and to said interrogation counting means for producing a second indication signal when said second difference counting means indicates a predetermined count of $R_a$ before said interrogation number counting means indicates a predetermined count of N;

said fourth means further includes means connected to said second difference counting means and to said interrogation counting means for producing said second non-accept signal when said difference counting means indicates a predetermined count of $R_a$ after said interrogation counting means indicates a predetermined count of at least N; and said seventh means further includes means connected to said second difference counting means and to said interrogation counting means for producing said first intermediate indication signal when said second difference counting means indicates a predetermined count of $R_a$ before said interrogation counting means indicates a predetermined count of at least N.

6. A method for determining whether replies to interrogations appear to come from a friend or an enemy comprising the steps of:

counting the number of interrogations;

counting the number of correct replies in a sequence W of last responses;

counting the number of incorrect replies in a sequence W of last responses;

subtracting the number of incorrect replies from the number of correct replies to produce a difference quantity T;

indicating that the replies appear to come from a friend if the difference quantity T becomes equal to or greater than a predetermined threshold $T_a$ before a predetermined number N or interrogations are counted;

counting the number of consecutive correct replies to accumulate a run-sum R;

indicating that the replies appear to come from a friend if said run-sum reaches or exceeds a predetermined number $R_a$ before a predetermined number N or interrogations are counted;

indicating that the replies do not appear to come from a friend if said predetermined number N or replies are counted before a friend indication occurs; and indicating that the responding signals constitute a trailing edge when said difference T is equal to or greater than a predetermined number $T_t$ before a predetermined number N or interrogations are counted;

or when said difference T is equal to $T_t$ after being at a greater predetermined number $T_a$;

or when said run-sum reaches or exceeds a predetermined number $R_a$ and said difference T is equal to or less than a predetermined number $T_t$ before a predetermined number N or interrogations are counted.

* * * * *